May 14, 1940.   G. W. WATSON ET AL   2,200,405
ELECTRICAL METHOD AND APPARATUS FOR PREPARING FOOD
Filed June 11, 1938   2 Sheets-Sheet 2
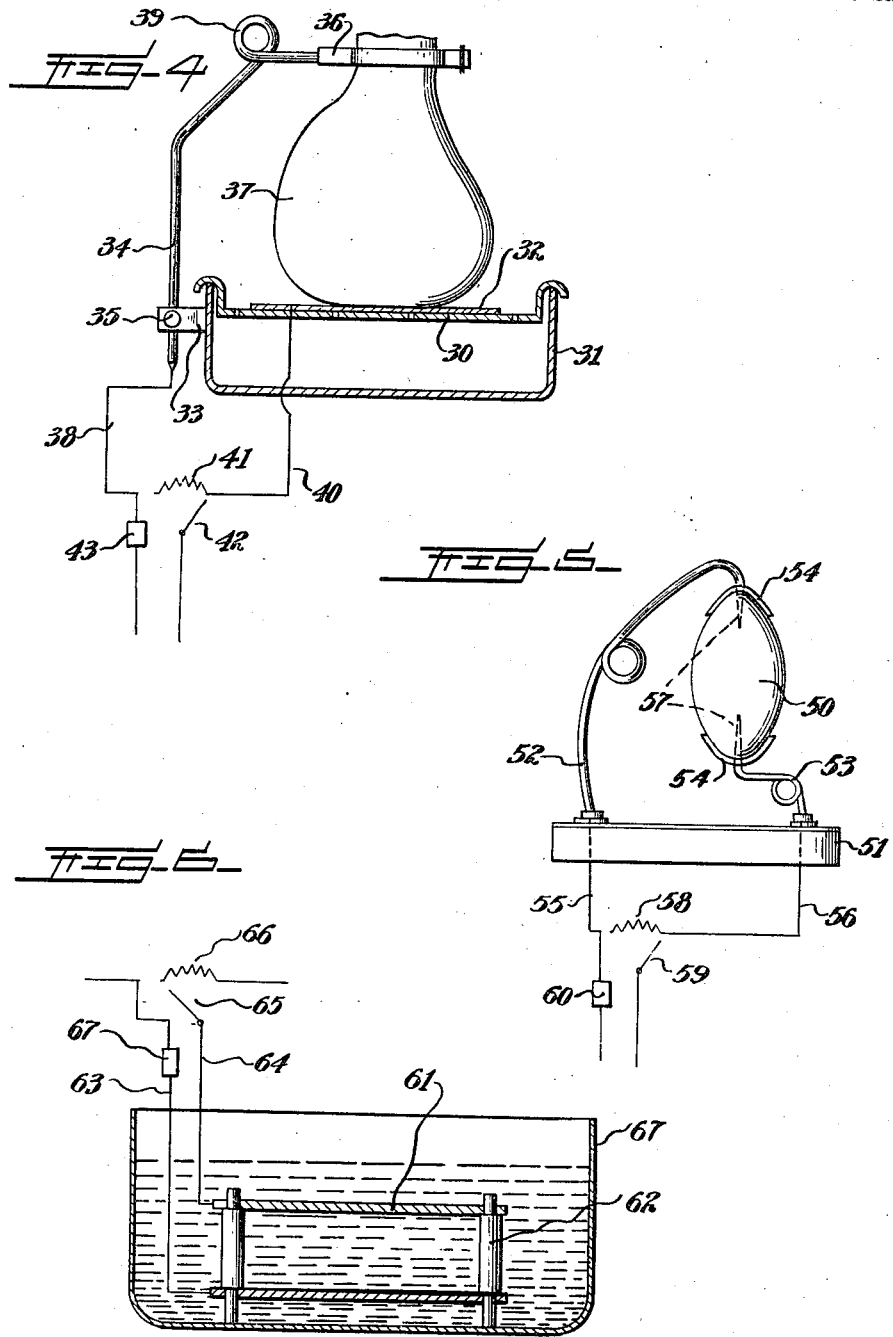
INVENTOR
Glenn W. Watson.
BY Earle C. Brannas.
Samuel Weisman
ATTORNEY Patented May 14, 1940

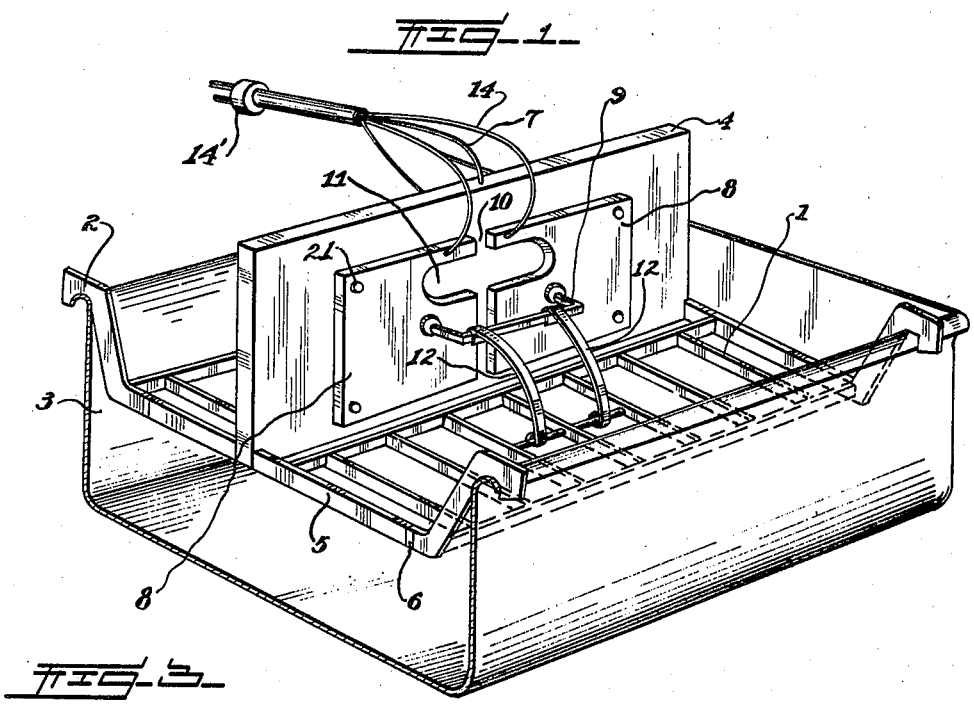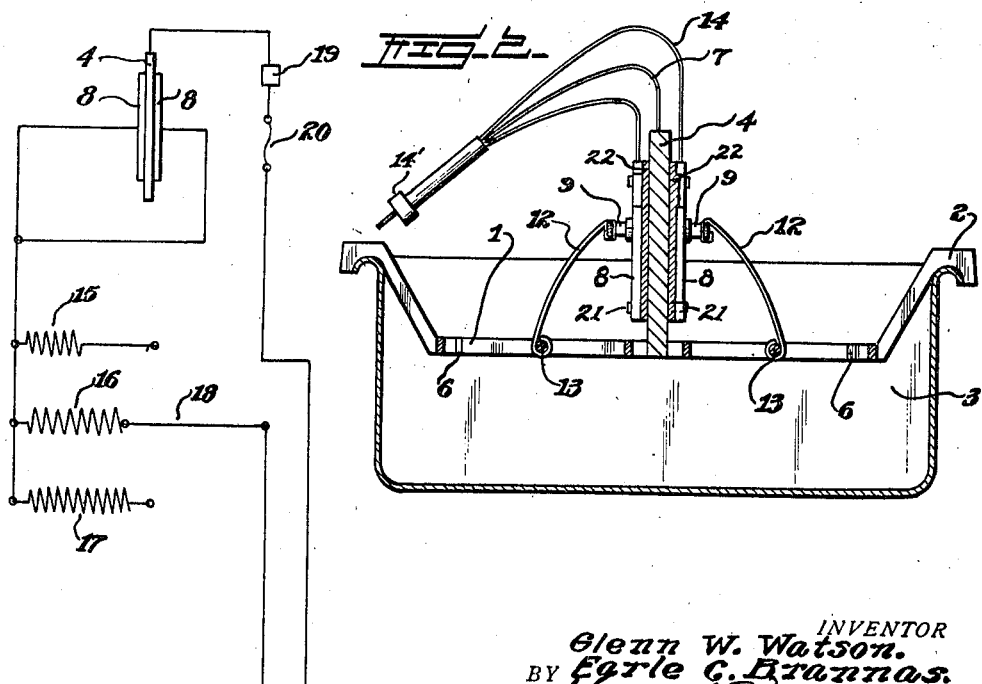

2,200,405

UNITED STATES PATENT OFFICE 2,200,405

ELECTRICAL METHOD AND APPARATUS FOR PREPARING FOOD

Glenn W. Watson and Earle C. Brannas, Detroit, Mich., assignors to Penweld Corporation, Detroit, Mich., a corporation of Michigan Application June 11, 1938, Serial No. 213,197

2 Claims. (Cl. 219—19)

The present invention pertains to a novel apparatus for and method of applying heat to foods to render them edible. In this respect, the invention embodies the various heat treatments of foods, such as cooking, baking, roasting etc.

The principal object of the invention is to accomplish these processes electrically in a fraction of the time ordinarily required, or rather in a few seconds, by means of an exceedingly simple apparatus. An important feature of the invention is that the apparatus itself remains comparatively cold during operation, with the result that comparatively little energy is lost by heat radiation, whereby the thermal efficiency is obviously higher than in conventional apparatus for similar purposes.

More specifically, the invention consists in applying opposite terminals of an electric circuit to the food being treated. The action of the current on the food gives the latter the proper treatment in a fraction of a minute. The degree of the treatment may obviously be controlled by regulating the time the current is permitted to flow, and this may be governed by a suitable thermo-switch in the circuit.

In the preparation of sliced meats, such as steaks, the apparatus consists of at least two plates at the above mentioned terminals. In a development of this apparatus, a plurality of plates may be connected to one or both terminals, and a slice of meat placed between plate surfaces of opposite sign. Thus, several slices of meat may be prepared simultaneously. This apparatus is designed so that the juices drip into a receptacle which may readily be separated from the remainder of the receptacle of the apparatus for cleaning as well as emptying.

In the preparation of hams, roasts and the like, one of the terminals is preferably in the form of a clamp fastened at one end of the meat and having an adjustable mounting to accommodate various sizes. For preparing smaller food bodies such as individual vegetables, eggs and the like, the terminals are in the form of prongs adapted for insertion in the ends of the body and also adjustable for various sizes. Another construction is provided for preparing liquid and semi-liquid foods such as soups, sauces, and stewed vegetables and fruits. This device consists of a pair of plates respectively connected to the terminals as aforesaid and joined to each other by means of insulating posts to form a unit in which the plates are held spaced apart. This device is merely immersed in the food and allowed to remain therein, with the current turned on, until the food has been properly prepared. Owing to its simple construction, this device can be washed with very little effort.

The invention is fully disclosed by way of example in the following description and in the accompanying drawings in which:

Figure 1 is a perspective view, partly in section, of one embodiment of the invention;

Figure 2 is a vertical cross section thereof;

Figure 3 is a wire diagram;

Figure 4 is an elevation, partly in section, of the apparatus for hams, roasts and the like;

Figure 5 is an elevation of the apparatus for preparing individual vegetables, eggs and the like, and Figure 6 is a vertical elevation of the apparatus for preparing liquid and semi-liquid foods.

Reference to these views will now be made by use of like characters which are employed to designate corresponding parts throughout.

In Figure 1 is shown a grill 1 carrying the electrical elements of the apparatus and formed as a unit therewith. The corners of the grill are preferably elevated and hooked at 2 in order that the device may be suspended from the upper edges of a receptacle 3 as clearly shown in Figures 1 and 2.

In the embodiments shown, a terminal plate 4 stands vertically on the grill, preferably in the longitudinal axis thereof, with its lower edge secured to the end rails 5 of the grill. The latter has insulating blocks 6 inserted therein near the hooked ends 2 to prevent flow of current to the wall of the receptacle. The plate 4 is joined by a conductor 7 to one side of the circuit.

At each side of the plate 4 is a complementary plate consisting of two like sections 8 related as right hand and left hand and carried by a yoke 9. The sections are spaced apart at their inner edges, as indicated by the numeral 10 in Figure 1 and are formed each with a horizontal slot 11 opening into the inner edge. The cross shaped space thus formed is adapted to receive or accommodate the more common sizes of steak bones, so that the latter do not interfere with the proper pressure of the plates 4 and 8 against the steak, as will be presently described. Each pair of sections 8 is supported by means of one or more spring bars 12 fastened to the corresponding yoke 9 and to a member 13 carried by the grill. The bars 12 also provide the pressure against the meat, as mentioned above. Each of the sections 8 is joined by a conductor 14 to the remaining side of the circuit, and all conductors terminate in the plug 14'.

The wiring arrangement is shown in Figure 3. One side of the circuit carries three unequal resistances 15, 16 and 17, and the other side of the circuit carries a movable switch member 18 adapted for connection to any one of the resistances for regulating the current strength. The circuit also contains a thermo-switch 19 for temperature control and a fuse 20 to open the circuit in case of overloading or short circuit.

The principle of construction illustrated in Figures 1, 2, and 3 may be extended by increasing the number of plates 4 and 8 so that more slices of meat may be treated at one time. In such construction, both surfaces of every plate, except the two outer ones, would be used. Certain of the plates, such as the split plates shown herein, are provided with insulated studs 21 extending therethrough and beyond the surfaces thereof to engage the plate of opposite sign and thereby prevent contact of opposite plates and the flow of current therethrough when the apparatus is not loaded. When the device is loaded, the studs lie beyond the edges of the slices of meat 22, as shown in Figure 2.

In the apparatus as shown in Figure 4, for treating hams, roasts and the like, there is provided a perforated plate 30, preferably of insulating material, adapted to rest on a receptacle 31. One of the terminal plates 32 rests on the member 31 and is spaced from the outer edge of the latter to be out of ordinary reach.

A suitable bracket 33 carried by the receptacle has a tubular insulating member 34 slidably mounted therein and held in an adjusted position by a set screw 35. The member 34 is also resilient and carries at its upper end a clamp 36 adapted to be tightened on the upper end of the piece of meat 37 which rests on the terminal plate 32. The clamp 36 is electrically connected to a conductor 38 passed through the tubular member 34. The latter is formed with a coil 39 or similar device whereby the member is adapted to exert a yielding pressure through the clamp 36 against the body 37.

The other side 40 of the circuit is electrically connected to the plate 32 and to a resistance 41 separated from the conductor 38. A switch arm 42 is movable over the resistance to govern the current strength. Either side of the circuit may contain the thermo-switch 43 serving the purpose described above.

The construction shown in Figure 5 is designed for preparing individual vegetables or eggs, as indicated by the numeral 50. A base 51 carries a pair of tubular, insulated and resilient members 52 and 53 similar to the member 34 of Figure 4. The free ends of these members are spaced apart sufficiently to receive the member 50 and are fitted with suitable stops 54 adapted to engage the corresponding ends of the last named member.

Conductors 55 and 56 are passed respectively through the members 52 and 53 and terminate in conducting prongs 57 at the free ends of the latter and extending beyond the stops 54. The prongs are inserted in the ends of the member 50, and the penetration is limited by the stops 54. The conductor 56 contains a resistance 58, separated from the conductor 55, and a movable switch arm 59 for engaging the same at various points to regulate the current. Either conductor may contain the thermo-switch 60 as stated above.

The construction shown in Figure 6 consists of two similar conducting plates 61 held together in spaced and preferably parallel relation by a suitable number of insulating spacer posts 62. Conductors 63 and 64 are connected respectively to the plates, one of the conductors containing a switch arm 65 movable over a resistance 66 for the purpose mentioned above. A thermo-switch 67 is provided in the circuit as well as a fuse (not shown) at a suitable point in each of the circuits shown in Figures 4, 5 and 6.

This device is adapted to be immersed in a receptacle 67 containing liquid or semi-liquid food to be warmed or cooked.

In each of the apparatus shown herein, the food is prepared in a small fraction of the time ordinarily required. For example, the apparatus shown in Figures 1, 2 and 3 prepares a medium done steak in ten to twelve seconds at 110 volts. The food, when prepared, is as hot as if prepared by ordinary methods, while the terminal plates or members are comparatively cool, indicating a high thermal efficiency.

As distinguished from other methods of preparing foods by cooking, baking, roasting etc., all of which involve radiation of heat, the present invention is characterized by the fact that it generates heat within the food itself by the resistance that the food presents to the passage of current therethrough. Most foods contain sufficient mineral salts to permit the passage of an adequate amount of current. In addition to the internal treatment of the food thus described, the moisture content is vaporized within the food, with the result that the food is steam cooked in its own juices.

The practical results of such treatment are that the original flavor of the food is retained better, and the finished food is more tender, than when prepared by conventional methods. In the latter connection, two steaks of the same cut were prepared respectively by frying and according to the invention. Although the steaks were practically identical in the raw condition, the second was considerably more tender than the first.

One of the important features of the invention is that the ordinary, unmodified house current is used. No high frequency devices are necessary, and in the case of alternating current, the ordinary frequency on the order of 25 or 60 cycles is quite satisfactory. Direct current may also be used. In either case, the ordinary house voltage, which is usually 110 or 220 volts but always on the order of 200 volts, is suitable for the purposes of this invention and for the results described above, without alteration and without the use of auxiliary means.

Screens and similar devices may be used at the terminals as well as the plates and prongs illustrated herein. The invention is also applicable, by use of the proper terminals for the baking of bread, cakes, pies, pancakes etc. In general, better results are obtained by changing the voltage, through a variable resistance, according to the thickness of any particular food or, in other words, according to the electrical resistance of the food.

With suitable variations in the current characteristics such as the amperage, voltage, frequency, and time, the invention may be adapted for the heat treatment of various materials other than foods.

Although specific embodiments of the invention have been illustrated and described, it will be understood that various alterations in the details of construction may be made without departing

What we claim is:

1. An apparatus of the character described comprising, in an electric circuit, a grill adapted to be supported on a receptacle, a conducting plate fixed edgewise to said grill, a plate at each side of the first named plate and movably mounted to permit insertion of food between it and the first plate, the first plate being connected to one side of said circuit and the remaining plates to the other side of the circuit.

2. An apparatus of the character described comprising, in an electric circuit, a grill adapted to be supported on a receptacle, a conducting plate fixed edgewise to said grill, a plate at each side of the first named plate and resiliently supported from said grill to permit insertion of food between it and the first plate, the first plate being connected to one side of said circuit and the remaining plates to the other side of the circuit.

GLENN W. WATSON.
EARLE C. BRANNAS.